United States Patent
Kaiser et al.

(10) Patent No.: US 10,584,226 B2
(45) Date of Patent: Mar. 10, 2020

(54) PULVERULENT MIXTURES CONTAINING LOW-EMISSION NITRILE RUBBERS

(71) Applicant: ARLANXEO DEUTSCHLAND GMBH, Dormagen (DE)

(72) Inventors: Andreas Kaiser, Dusseldorf (DE); Sven Brandau, Strasbourg (FR); Robert Staber, Ebsdorfergrund (DE)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 0 days.

(21) Appl. No.: 15/565,719

(22) PCT Filed: Apr. 11, 2016

(86) PCT No.: PCT/EP2016/057934
§ 371 (c)(1),
(2) Date: Oct. 11, 2017

(87) PCT Pub. No.: WO2016/166063
PCT Pub. Date: Oct. 20, 2016

(65) Prior Publication Data
US 2018/0079886 A1    Mar. 22, 2018

(30) Foreign Application Priority Data
Apr. 13, 2015 (EP) .................................. 15290101

(51) Int. Cl.
| | | |
|---|---|---|
| *C08K 3/26* | (2006.01) | |
| *C08J 3/12* | (2006.01) | |
| *C08L 27/06* | (2006.01) | |
| *C08F 236/12* | (2006.01) | |
| *C08C 2/00* | (2006.01) | |
| *C08C 1/14* | (2006.01) | |

(52) U.S. Cl.
CPC .................. *C08K 3/26* (2013.01); *C08C 1/14* (2013.01); *C08C 2/00* (2013.01); *C08F 236/12* (2013.01); *C08J 3/12* (2013.01); *C08L 27/06* (2013.01); *C08J 2309/02* (2013.01); *C08K 2003/265* (2013.01)

(58) Field of Classification Search
CPC .... C08K 3/26; C08J 3/12; C08L 27/06; C08F 236/12

USPC ......................................................... 524/426
See application file for complete search history.

(56) References Cited

U.S. PATENT DOCUMENTS

| | | | |
|---|---|---|---|
| 2,434,536 | A | 1/1948 | Arundale |
| 2003/0144406 | A1* | 7/2003 | Gorl ........................ C08J 3/215 524/495 |
| 2007/0055018 | A1 | 3/2007 | Achten et al. |
| 2011/0123747 | A1 | 5/2011 | Obrecht et al. |
| 2016/0369014 | A1 | 12/2016 | Paul et al. |

FOREIGN PATENT DOCUMENTS

| | | |
|---|---|---|
| CA | 2687564 C | 11/2008 |
| CN | 1468873 A | 1/2004 |
| CN | 1730544 A | 2/2006 |
| CN | 1029617940 A | 8/2012 |
| CN | 102757597 A | 10/2012 |
| CN | 103497373 A | 1/2014 |
| CN | 104193907 A | 12/2014 |
| EP | 2860197 A1 | 4/2015 |
| JP | 4920927 B1 | 5/1974 |
| JP | S5053713 | 3/1975 |
| RU | 2464279 C2 | 10/2012 |
| TW | 201211064 A1 | 3/2012 |
| TW | 433883 B | 4/2014 |

OTHER PUBLICATIONS

"Practical Technology and Application of Plastic Modification", High-Rubber Powder, Powdered Nitrile Butadiene Rubber, and Liquid Rubber, pp. 192-195, 2019, http://www.zirankxzl.cn/n/print.jsp (English translation provided).

S. He, et al.; "Preparation of powdered nitrile butadiene rubber by means of coagulation", China Synthetic Rubber Industry, 1997, vol. 20, No. 6, pp. 331-334 (English translation provided).

* cited by examiner

*Primary Examiner* — Deve V Hall
(74) *Attorney, Agent, or Firm* — Norris McLaughlin, PA

(57) ABSTRACT

Pulverulent mixtures containing at least one nitrite rubber and at least one release agent, which are characterized by a particular average particle diameter, are provided. These mixtures have particularly low emissions and are outstandingly suitable for producing materials and components for indoor applications.

14 Claims, No Drawings

PULVERULENT MIXTURES CONTAINING LOW-EMISSION NITRILE RUBBERS

The present invention relates to low-emission pulverulent mixtures containing at least one specific nitrile rubber and one or more release agents, the production thereof and also the use thereof for producing composites additionally containing at least one thermoplastic and materials based thereon, in particular components for indoor applications.

Pulverulent nitrile rubbers are used in a variety of applications. They are utilized, for example, in the modification of phenolic resins in the production of brake components, linings or discs. Furthermore, they are used for modifying thermoplastics, in particular for modifying polyvinyl chloride (PVC) because of the excellent compatibility with this widespread plastic. Such elasticized PVCs are used, for example, for producing profiles, cable sheathing or seals. Various components of this type are used in the automobile sector. Accordingly, potential applications of these components are also found in vehicle interiors, in particular in interiors of motor vehicles, or, if not in the automobile sector, in, for example, interiors of buildings. In this regard, the provision of pulverulent rubbers having low emission values is of increasing importance since a greater number of new standards and regulations for reducing emissions have been set up in recent years. Reducing and limiting emissions from plastic components and from rubbers and thus also from elasticized thermoplastics is therefore a particular requirement.

In principle, a number of rubbers such as NBR, EPDM or SBR are conceivable for producing elastomers in powder form. However, particularly when modification of PVC, polyurethanes or polyamides is desired (e.g. to increase the impact toughness), nitrile rubbers are particularly suitable because of the excellent compatibility. In this case, the use of rubber powders allows better metering and also dispersion in the thermoplastic and thus a more homogeneous property profile.

The American Indoor airPLUS list recommends the use of low-emission materials especially for indoor applications. ISO 12219-1:2012 describes the testing procedure and the determination of VOCs (volatile organic compounds) in the interior of automobiles. Three different tests are described in this ISO standard, with two relating to determination of volatile VOCs in automobile interiors and one relating to the determination of formaldehyde.

An example of the use of low-emission polymeric materials may be found in CN 10275759, in which particularly low-odour polypropylene (PP) which is modified with elastomeric materials is described. The material described is characterized by a low odour and also good mechanical properties. The low odour is achieved by addition of a deodorizer, i.e. an odour-absorbing agent. These materials are said to be particularly suitable for use in vehicle interiors. A particular form of work-up or the form in which the polymers used are employed is not mentioned.

The application CN 1730544 describes the production of a component using an ABS resin which is characterized by reduced odour. Here, an "odour-suppressing" substance is introduced together with the terpolymer during compounding. The substance is an alkali metal-aluminium silicate powder or a combination of these with silica gel. The substances responsible for the odour are still present in the polymer and are merely bound by means of the odour-absorbing materials. A particular form of work-up or the form in which the polymers used are employed is not mentioned.

CN 102617940 describes the production of mixtures of various elastomers, including NBR, with typical additives. The rubber obtained is characterized by good insulating properties and is said to be suitable for use in the automobile sector. No pointer is given to a method of reducing emissions of any kind.

The use of mercaptans as chain transfer agents during plymerization in order to produce copolymers or terpolymers is described in JP 50023713. These terpolymers contain, inter alia, acrylonitrile and butadiene as monomer building blocks. After carrying out the polymerization, the latex is treated with peroxide or peroxyacetic acid and a reduction in odour of the polymer is thus achieved. A disadvantage of this method is that the polymer present in the latex may react with the peroxide or the peroxyacetic acid and formation of undesirable accompanying products or premature crosslinking may occur.

In an as yet unpublished European patent application by the applicant, the provision of nitrile rubbers having very good vulcanization behaviour and at the same time improved emission behaviour is described, with the corresponding vulcanizates having excellent properties. These nitrile rubbers having repeating units of at least one α,β-unsaturated nitrile monomer and at least one conjugated diene monomer are characterized by an emission ratio E according to the formula (1) of less than or equal to 0.25 mg/kg*Mooney units), $$E = \frac{[\text{volatile constituents}]}{[\text{Mooney viscosity}]} \times \frac{[\text{Nitrile content}]}{100} \qquad (I)$$

where
[volatile constituents] is the concentration of volatile constituents in mg/kg of nitrite rubber determined by means of a TDS-GC/MS examination in accordance with the VDA 278 recommendation (09.2002 version) in the range from 28.4 minutes to 34.0 minutes,
[Mooney viscosity] is the Mooney viscosity ML 1+4 at 100° C. of the nitrile rubber determined in accordance with ASTM D 1646 and reported in Mooney units and
[nitrile content] is the dimensionless content of the α,β-unsaturated nitrile in the nitrile rubber, determined in % by weight by the Kjeldahl method in accordance with DIN 53 625.

These nitrile rubbers are obtainable when the emulsion polymerization is carried out with selection of specific chain transfer agents and the polymerization is at the same time continued to a conversion of 60% or above. Vulcanizable mixtures based on low-emission nitrile rubber and their general suitability for belts, roller coverings, seals, caps, stoppers, hoses, floor coverings, sealing mats or plates, profiles or membranes are also described. Whether and in what physical form the low-emission rubbers are obtained and are used for producing the corresponding shaped bodies is not indicated. The typical use form for the applications mentioned there is that of a rubber ball or rubber crumb. Nothing is said about the properties of pulverulent NBRs.

For the purposes of the present invention, nitrile rubbers, also referred to as "NBR" for short, are rubbers which are copolymers or terpolymers of at least one α,β-unsaturated nitrile, at least one conjugated diene and optionally one or more further copolymerizable monomers. Such nitrile rubbers and processes for preparing such nitrile rubbers are known, see, for example Ullmann's Encyclopedia of Industrial Chemistry, VCH Verlagsgesellschaft, Weinheim, 1993, pp. 255-261.

NBR is typically prepared by emulsion polymerization, with an NBR latex firstly being obtained. The NBR solid is isolated from this latex by coagulation, usually using salt or acids. The solid rubbers obtained in this way can be converted by milling into pulverulent elastomers. In an alternative work-up, the NBR powder is obtained directly from the latex by spraying drying. The emulsion polymerization usually has to be carried out using chain transfer agents in order to obtain polymers having good process properties. Chain transfer agents which are frequently used are based on mercaptans. To regulate the molecular weight of emulsion rubbers based on monomers such as styrene, butadiene, acrylonitrile, (meth)acrylic acid, fumaric acid, ethyl acrylate, butyl acrylate, 2-ethylhexyl acrylate, chloroprene and others, the use of dodecyl mercaptans is of particular importance.

It is stated in U.S. Pat. No. 2,434,536 that synthetic rubbers based on diolefins such as butadiene and optionally further copolymerizable monomers such as styrene, α-methylstyrene, vinylnaphthalene, acrylonitrile, methacrylonitrile, methyl methacrylate, ethyl fumarate or methyl vinyl ketone can be prepared by emulsion polymerization in the presence of aliphatic mercaptans as chain transfer agents. It is disclosed that these mercaptans have at least 7 and preferably 10 or more carbon atoms. Preference is given to using aliphatic mercaptans which have an average molecular weight of from 188 to 230 and comprise at least 50% of dodecyl mercaptan and the balance to 100% in the form of mercaptans having from 10 to 16 carbon atoms.

EP-A-0 692 496, EP-A-0 779 301 and EP-A-0 779 300 each describe nitrile rubbers which are based on an unsaturated nitrile and a conjugated diene and all comprise 10-60% by weight of unsaturated nitrile and have a Mooney viscosity in the range 15-150, or in the case of EP-A-0 692 496 of 15-65, and all have at least 0.03 mol of a $C_{13}$-$C_{16}$-alkylthio group per 100 mol of monomer units, where this alkylthio group includes at least three tertiary carbon atoms and has a sulphur atom which is bound directly to at least one of the tertiary carbon atoms. The nitrile rubbers are in each case prepared in the presence of a $C_{12}$-$C_{16}$-alkyl thiol which has a corresponding structure and functions as chain transfer agent and is thus incorporated as end group into the polymer chains. Measures by means of which the VOC values of the nitrile rubber or powder containing nitrile rubber and also the property profile of composites or shaped parts based thereon can be influenced cannot be derived from the teaching of this patent.

In Ullmansss Enzyklopädie der technischen Chemie, 4$^{th}$ Edition, Volume 13, pp. 611-612, it is stated in general terms that the molecular weight of nitrile-butadiene rubbers can be regulated by use of alkyl mercaptans, disulphides and polysulphides or xanthogen disulphides. tert-Dodecyl mercaptan and diisopropyl xanthogen disulphides are mentioned as chain transfer agents which are mainly used. In industrial practice, too, tertiary dodecyl mercaptans (also referred to as "TDM" or "TDDM" for short) are frequently used. A known example is the TDM which is commercially available from Chevron Philips and generally consists of a wide mixture of a variety of isomers. Studies by the present applicant have shown that nitrile rubbers prepared using tertiary dodecyl mercaptans display a high proportion of sulphur compounds and also non-sulphur-containing impurities of the TDM in VOC tests (carried out by means of TDS-GC/MS studies in accordance with the VDA 278 recommendation) and these sulphur compounds and other impurities can lead to perceptible and unpleasant odour pollution in some practical applications, especially indoors.

While there is extensive literature concerning the influence of the various salts which can be used for latex coagulation on the properties of the nitrile rubber obtained, there is no information whatsoever or studies on the influence of the chain transfer agents on she VOC values of nitrile rubbers. However, for specific applications in interiors, e.g. in the building sector or in vehicle interiors, based on nitrile rubbers the VOC values are of considerable importance. This applies both to the use of NBR as solid rubber and also to the use of NBR in powder form.

In summary, it can be said that there have to the present day been no known measures for, when using mercaptans as chain transfer agents, obtaining nitrile rubbers and pulverulent mixtures containing these which have a significantly reduced VOC content and can be utilized for producing such components in interiors for which the use of pulverulent mixtures is advantageous.

In general, the demands of industry in respect of rubbers having low emission values have increased, especially for applications in interiors such as passenger compartments of automobiles. In the production of nitrile rubber-based powder grades by milling or spray drying, a reduction in the volatile components can be achieved when the starting rubbers still contain relatively high proportions of volatile constituents. These are given off in the production of the powders into the production surroundings and thus increase pollution for human beings and the environment in the vicinity of production. In order to minimize this pollution, the constituents of the polymerization formulation should be selected so that a reduction in the VOC values is made possible thereby.

It is an object of the present invention to provide pulverulent mixtures which contain nitrile rubbers and are suitable for producing components which may be employed in interiors and display significantly lower emissions than nitrile rubber powders known hitherto.

The present invention accordingly provides a pulverulent mixture containing
(1) at least one nitrile rubber which has repeating units of at least one α,β-unsaturated nitrile monomer and at least one conjugated diene monomer and has an emission ratio E according to the formula (I) of less than or equal to 0.25 mg/(kg*Mooney units), $$E = \frac{[\text{volatile constituents}]}{[\text{Mooney viscosity}]} \times \frac{[\text{Nitrile content}]}{100} \qquad (I)$$

where
[volatile constituents] is the concentration of volatile constituents in mg/kg of nitrile rubber determined by means of a TDS-GC/MS examination in accordance with the VDA 278 recommendation (09.2002 version) in the range from 28.4 minutes to 34.0 minutes,
[Mooney viscosity] is the Mooney viscosity ML 1+4 at 100° C. of the nitrile rubber determined in accordance with ASTM D 1646 and reported in Mooney units, and
[nitrile content] is the dimensionless content of the α,β-unsaturated nitrile in the nitrile rubber, determined in % by weight by the Kjeldahl method in accordance with DIN 53 625, and (2) one or more release agents,
characterized in that the pulverulent mixture of (1) and (2) has an average particle diameter $D_n$ in the range from 0.01 to 4 mm.

The invention further provides the production of the low-emission pulverulent mixtures of the invention and also the use thereof for producing composites which additionally contain at least one thermoplastic, these composites and components based thereon.

Average Particle Diameter of the Pulverulent Mixtures:

The average particle diameter $D_a$ of the pulverulent mixture is determined granulometrically by weighing 100 g of the pulverulent mixture into a sieve having a mesh opening of 2.0 mm, placing further sieves having the mesh openings 1.4; 1.0; 0.8; 0.6 and 0.3 mm underneath this first sieve, clamping the assembled sieves in a vibratory sieving machine (e.g. AS 200 control "g", from Retsch) and vibrating the assembly at an amplitude of 2.00 mm for a period of 30 minutes, subsequently weighing the contents of each sieve and calculating the average particle diameter $D_a$ according to the formula (1)

$$D_a = \Sigma(X_i D_i)/100 \quad (1)$$

where
$D_a$ is the average particle diameter in mm
$X_i$ is the % by weight of the mass of the pulverulent mixture retained in the respective sieve in g
$D_i$ is the average mesh opening of the respective sieve n and n+1 in mm, which is given by the formula (2) below $$D_i = (D_n + D_{(n+1)})/2 \quad (2)$$

where
$D_n$ is the mesh diameter of the sieve n in mm and
$D_{(n+1)}$ is the mesh diameter of the sieve n+1 in mm.

The average particle diameter of the pulverulent mixtures of the invention can be influenced to a certain extent within the abovementioned limits of 0.01 to 4 mm by the method of production, as described below:

In one embodiment, the pulverulent mixtures have an average particle diameter $D_n$ in the range from 0.01 to 4 mm, preferably in the range from 0.05 to 3 mm, particularly preferably in the range from 0.1 mm to 2 mm and in particular in the range from 0.2 mm to 1.5 mm. These pulverulent mixtures are, for example, obtainable when nitrile rubbers (1) obtainable by milling are used.

In a further embodiment, the pulverulent mixtures have an average particle diameter $D_n$ in the range from 0.01 to 2 mm, preferably in the range from 0.04 mm to 1 mm, particularly preferably in the range from 0.06 to 0.75 mm and in particular in the range from 0.08 mm to 0.12 mm. These pulverulent mixtures are, for example, obtainable when nitrile rubbers (1) obtainable by spray drying are used.

The procedure for both embodiments will be described below in the context of the production of the pulverulent mixtures.

Nitrile Rubber:

The nitrile rubber present in the pulverulent mixtures of the invention has an emission ratio E according to the general formula (1) of less than or equal to 0.25 mg/(kg*Mooney units), preferably less than or equal to 0.22 mg/(kg*Mooney units) and particularly preferably less than or equal to 0.20 mg/(kg*Mooney units).

The volatile constituents whose concentration is determined by the TDS-GC/MS examination in accordance with the VDA 278 recommendation (09.2002 version) in the range from 28.4 minutes to 34.0 minutes for the purpose of calculating the emission coefficient are typically volatile constituents of the chain transfer agent used.

The determination of the Mooney viscosity of the nitrile rubber (ML 1+4 at 100° C.) in accordance with ASTM D 1646 is typically carried out using uncalendered nitrile rubbers according to the invention.

The nitrile rubbers to be used according to the invention have repeating units of at least one unsaturated nitrile and at least one conjugated diene. They can optionally additionally contain repeating units of one or more further copolymerizable monomers. It is important that the emission ratio E according to the general formula (1) is less than or equal to 0.25 mg/(kg Mu).

The repeating units in the nitrile rubber which are based on the at least one conjugated diene are preferably derived from ($C_4$-$C_6$) conjugated dienes. Particular preference is given to 1,2-butadiene, 1,3-butadiene, isoprene, 2,3-dimethylbutadiene, piperylene or mixtures thereof. 1,3-Butadiene and isoprene or mixtures thereof are particularly preferred. Very particular preference is given to 1,3-butadiene.

As $\alpha,\beta$-unsaturated nitrile, it is possible to use any known $\alpha,\beta$-unsaturated nitrile for preparing the nitrile rubbers according to the invention; preference is given to ($C_3$-$C_5$)-$\alpha,\beta$-unsaturated nitriles such as acrylonitrile, methacrylonitrile, ethacrylonitrile or mixtures thereof. Particular preference is given to acrylonitrile.

In an embodiment of the invention, the pulverulent mixture contains a nitrile rubber containing repeating units of acrylonitrile and butadiene, particularly preferably with repeating units of exclusively acrylonitrile and butadiene.

As further copolymerizable monomers, it is possible to use, for example, aromatic vinyl monomers, preferably styrene, $\alpha$-methylstyrene and vinylpyridine, and also unconjugated dienes, e.g. 4-cyanocyclohexene and 4-vinylcyclohexene, or else alkynes, e.g. 1- or 2-butyne.

Furthermore, monomers containing epoxy groups, preferably glycidyl acrylate and glycidyl methacrylate, can be used as copolymerizable termonomers.

As an alternative, carboxyl-containing, copolymerizable termonomers, for example $\alpha,\beta$-unsaturated monocarboxylic acids, esters thereof, $\alpha,\beta$-unsaturated dicarboxylic acids, monoesters or diesters thereof or the corresponding anhydrides or amides thereof, can be used as further copolymerizable monomers.

As $\alpha,\beta$-unsaturated monocarboxylic acids, preference is given to using acrylic acid and methacrylic acid.

It is also possible to use esters of $\alpha,\beta$-unsaturated monocarboxylic acids, preferably the alkyl esters and alkoxyalkyl esters thereof. Preference is given to the alkyl esters, in particular $C_1$-$C_{18}$-alkyl esters, of $\alpha,\beta$-unsaturated monocarboxylic acids. Particular preference is given to alkyl esters, in particular $C_1$-$C_{18}$-alkyl esters, of acrylic acid or of methacrylic acid, in particular methyl acrylate, ethyl acrylate, propyl acrylate, n-butyl acrylate, tert-butyl acrylate, 2-ethylhexyl acrylate, n-dodecyl acrylate, methyl methacrylate, ethyl methacrylate, butyl methacrylate and 2-ethylhexyl methacrylate. Preference is also given to alkoxyalkyl esters of $\alpha,\beta$-unsaturated monocarboxylic acids, particularly preferably alkoxyalkyl esters of acrylic acid or of methacrylic acid, in particular $C_2$-$C_{12}$-alkoxyalkyl esters of acrylic acid or of methacrylic acid, very particularly preferably methoxymethyl acrylate, methoxyethyl (meth)acrylate, ethoxyethyl (meth)acrylate and methoxyethyl (meth)acrylate. It is also possible to use mixtures of alkyl esters such as those mentioned above with alkoxyalkyl esters, e.g. in the form of those mentioned above. It is also possible to use hydroxyalkyl acrylates and hydroxyalkyl methacrylate in which the number of carbon atoms in the hydroxyalkyl groups is 1-12; preferably 2-hydroxyethyl acrylate, 2-hydroxyethyl methacrylate and 3-hydroxypropyl acrylate; it is also possible to use α,β-unsaturated carboxylic esters containing amino groups, e.g. dimethylaminomethyl acrylate and diethylaminoethyl acrylate.

It is also possible to use α,β-unsaturated dicarboxylic acids, preferably maleic acid, fumaric acid, crotonic acid, itaconic acid, citraconic acid and measaconic acid, as further copolymerizable monomers.

α,β-Unsaturated dicarboxylic anhydrides, preferably maleic anhydride, itaconic anhydride, citraconic anhydride and mesaconic anhydride, can also be used.

Monoesters or diesters of α,β-unsaturated dicarboxylic acids can also be used.

These α,β-unsaturated dicarboxlic monoesters or diesters can be, for example, alkyl, preferably $C_1$-$C_{10}$-alkyl, in particular ethyl, n-propyl, isopropyl, n-butyl, tert-butyl, n-pentyl or n-hexyl, monoesters or diesters, alkoxyalkyl, preferably $C_2$-$C_{12}$-alkoxyalkyl, particularly preferably $C_3$-$C_8$-alkoxyalkyl, monoesters or diesters, hydroxyalkyl, preferably $C_1$-$C_{12}$-hydroxyalkyl, particularly preferably $C_3$-$C_8$-hydroxyalkyl, monoesters or diesters, cycloalkyl, preferably $C_5$-$C_{12}$-cycloalkyl, particularly preferably $C_6$-$C_{12}$-cycloalkyl, monoesters or diesters, alkylcycloalkyl, preferably $C_6$-$C_{12}$-alkylcycloalkyl, particularly preferably $C_7$-$C_{10}$-alkylcycloalkyl, monoesters or diesters, aryl, preferably $C_6$-$C_{14}$-aryl, monoesters or diesters, with the diesters in each case also being able to be mixed esters.

Particularly preferred alkyl esters of α,β-unsaturated monocarboxylic acids are methyl (meth)acrylate, ethyl (meth)acrylate, propyl (meth)acrylate, n-butyl (meth)acrylate, t-butyl (meth)acrylate, hexyl (meth)acrylate, 2-ethylhexyl (meth)acrylate, octyl (meth)acrylate, 2-propylheptyl acrylate and lauryl (meth)acrylate. In particular, n-butyl acrylate is used.

Particularly preferred alkoxyalkyl esters of α,β-unsaturated monocarboxylic acids are methoxyethyl (meth)acrylate, ethoxyethyl (meth)acrylate and methoxyethyl (meth)acrylate. In particular, methoxyethyl acrylate is used.

As other esters of α,β-unsaturated monocarboxylic acids, use is made of, for example, polyethylene glycol (meth)acrylate, polypropylene glycol (meth)acrylate, N-(2-hydroxyethyl)acrylamide, N-(2-hydroxymethyl)acrylamide and urethane (meth)acrylate.

As α,β-unsaturated dicarboxylic diesters, it is possible to use the analogous diesters based on the abovementioned monoester groups, with the ester groups also being able to be chemically different ester groups.

Possible further copolymerizable monomers are also free-radically polymerizable compounds which contain at least two olefinic double bonds per molecule. Such monomers accordingly lead to a certain degree of precrosslinking of the nitrile rubber. Examples of multiply unsaturated compounds are acrylates, methacrylates, or itaconates of polyols, e.g. ethylene glycol diacrylate, diethylene glycol dimethacrylate, triethylene glycol diacrylate, 1,4-butanediol diacrylate, 1,2-propanediol diacrylate, 1,3-butanediol dimethacrylate, neopentyl glycol diacrylate, trimethylolpropane di(meth)acrylate, trimethylolethane di(meth)acrylate, glycerol diacrylate and triacrylate, pentaerythritol di, -tri- and tetraacrylate or di-, -tri and tetramethacrylate, dipentaerythritol tetra-, penta- and hexaacrylate or tetra-, -penta- and hexamethacrylate or tetra-, -penta- and hexaitaconate, sorbitol tetraacrylate, sorbital hexamethacrylate, diacrylates or dimethacrylates of 1,4-cyclohexanediol, 1,4-dimethylolcyclohexane, 2,2-bis(4-hydroxyphenyl)propane, of polyethylene glycols or of oligoesters or oligourethanes having terminal hydroxyl groups. As multiply unsaturated monomers, it is also possible to use acrylamides such as methylenebisacrylamide, hexamethylene-1,6-bisacrylamide, diethylenetriamine trismethacrylamide, bis(methacrylamido-propoxy)ethane or 2-acrylamidoethyl acrylate. Examples of multiply unsaturated vinyl and allyl compounds are divinylbenzene, ethylene glycol divinyl ether, diallyl phthalate, allyl methacrylate, diallyl maleate, triallyl isocyanurate or triallyl phosphate. In an embodiment of the invention, ethylene glycol diacrylate or trimethylolpropane di(meth)acrylate is used as copolymerizable monomer of this type, preferably together with acrylonitrile and butadiene as further monomers. Here, it has been found to be advantageous to use this copolymerizable monomer in an amount of up to 10% by weight, preferably up to 7% by weight, based on the total amount of monomers.

The proportions of conjugated diene and α,β-unsaturated nitrile in the nitrile rubbers to be used can vary within a wide range. The proportion of the conjugated diene or the totality of the conjugated dienes is usually in the range From 20 to 95% by weight, preferably in the range from 45 to 90% by weight, particularly preferably in the range from 50 to 85% by weight, based on the total polymer. The proportion of the α,β-unsaturated nitrile or the totality of the α,β-unsaturated nitriles is usually from 5 to 80% by weight, preferably from 10 to 55% by weight, particularly preferably from 15 to 50% by weight, based on the total polymer. The proportions of the repeating units of conjugated diene and α,β-unsaturated nitrile in the nitrile rubbers of the invention in each case add up to 100% by weight.

The additional monomers can be present in amounts of from 0 to 40% by weight, preferably from 0 to 30% by weight, particularly preferably from 0 to 26% by weight, based on the total polymer. In this case, corresponding proportions of the repeating units of the conjugated diene or dienes and/or the repeating units of the α,β-unsaturated nitrile or nitriles are replaced by additional monomers, with the proportions of all repeating units in the monomers once more in each case adding up to 100% by weight.

The nitrile content is determined via the nitrogen content which is determined by the Kjeldahl method in accordance with DIN 53 625 in the nitrile rubbers.

The nitrile rubbers have Mooney viscosities ML 1+4 @ 100° C. of from 10 to 150 Mooney units (MU), preferably from 20 to 100 MU. The Mooney viscosity ML 1+4@ 100° C. is determined at 100° C. by means of a shear disc viscometer in accordance with DIN 53523/3 or ASTM D 1646. This measurement is typically carried out using uncalendered nitrile rubber samples.

The glass transition temperatures of the nitrile rubbers are in the range from −70° C. to −10° C., preferably in the range from −60° C. to 0° C.

Preference is given to nitrile rubbers which contain repeating units of acrylonitrile and 1,3-butadiene, particularly preferably ones which have exclusively repeating units of acrylonitrile and 1,3-butadiene.

Preference is also given to nitrile rubbers which have repeating units of acrylonitrile, 1,3-butadiene and one or more further copolymerizable monomers. Particular preference is given to nitrile rubbers which have repeating units of acrylonitrile, 1,3-butadiene and one or more α,β-unsaturated monocarboxylic or dicarboxylic acids, or esters or amides thereof, and in particular repeating units of an alkyl ester of an α,β-unsaturated carboxylic acid, very particularly preferably of methyl (meth)acrylate, ethyl (meth)acrylate, propyl (meth)acrylate, n-butyl (meth)acrylate, t-butyl (meth)acrylate, hexyl (meth)acrylate, 2-ethylhexyl (meth)acrylate, octyl (meth)acrylate or lauryl (meth)acrylate, or one or more multiply unsaturated compounds and in particular repeating units of ethylene glycol diacrylate, diethylene glycol dimethacrylate, triethylene glycol diacrylate, 1,4-butanediol diacrylate, 1,2-propanediol diacrylate, 1,3-butanediol dimethacrylate, neopentyl glycol diacrylate, trimethylolpropane di(meth)acrylate, trimethylolethane di(meth)acrylate, glycerol diacrylate and triacrylate, pentaerythritol di, -tri- and tetraacrylate or di-, -tri and tetramethacrylate, dipentaerythritol tetra-, penta- and hexaacrylate or tetra-, -penta- and hexamethacrylate or tetra-, -penta- and hexaitaconate, sorbitol tetraacrylate, sorbitol hexamethacrylate, diacrylates or dimethacrylates of 1,4-cyclohexanediol, 1,4-dimethylolcyclohexane, 2,2-bis(4-hydroxyphenyl) propane, of polyethylene glycols or of oligoesters or oligourethanes having terminal hydroxyl groups, methylenebisacrylamide, hexamethylene-1,6-bisacrylamide, diethylenetriamine trismethacrylamide, bis(methacrylamidopropoxy)ethane, 2-acrylamidoethyl acrylate, divinylbenzene, ethylene glycol divinyl ether, diallyl phthalate, allyl methacrylate, diallyl maleate, triallyl isocyanurate or triallyl phosphate.

The nitrile rubber to be used according to the invention additionally has built-in fragments of the chain transfer agent used. The volatile constituents whose concentration is determined by TDS-GC/MS examination in accordance with the VDA 278 recommendation (09.2002 version) in the range from 28.4 minutes to 34.0 minutes for the purpose of determining the emission coefficients are volatile constituents of the chain transfer agent used.

Release Agents:

The pulverulent mixtures contain one or more release agents in addition to the above-described nitrile rubber. Suitable release agents are any materials which ensure the formation of lumps in the pulverulent nitrile rubbers over the desired storage time. The release agents are typically likewise pulverulent.

The release agents are preferably selected from among silicas, especially those having a specific BET surface area of more than 5 m$^2$/g, which can also be chemically modified, particularly preferably hydrophobilized, calcium carbonate, magnesium carbonate, silicates, particularly preferably talc, mica, bentonites or montmorillonites, fatty acid salts, particularly preferably alkali metal salts and alkaline earth metal salts of fatty acids having more than 10 carbon atoms, very particularly preferably calcium salts or magnesium salts of such fatty acids, in particular calcium stearate, magnesium stearate and aluminium zinc stearate, calcium phosphate, aluminium oxide, barium sulphate, zinc oxide, titanium dioxide, polymers having a high glass transition temperature, for example of more than 60° C., particularly preferably polyesters, polyolefins, polyvinyl chloride and starch, hydrophilic polymers, particularly preferably polyvinyl alcohol, polyalkylene oxide compounds, in particular polyethylene oxide compounds such as polyethylene glycols or polyethylene glycol ethers, polyacrylic acid, polyvinylpyrrolidone and cellulose derivatives, fluorinated hydrocarbon polymers, carbon nanotubes and mixtures of the release agents mentioned. Particular preference is given to using release agents selected from the group consisting of silica, calcium carbonate, silicate, PVC and fatty acid salts.

The one or more release agent(s) is/are present in the pulverulent mixture of the invention in a total amount in the range of typically from 0.25 to 45% by weight, preferably 1-45% by weight, preferably 2-25% by weight and particularly preferably 4-15% by weight, based on the total mixture.

In an alternative embodiment, the one or more release agent(s) is/are used in the pulverulent mixture of the invention in a total amount in the range from 5 to 10% by weight, based on the total mixture.

Process for Producing the Pulverulent Mixtures of the Invention:

The nitrile rubbers to be used are prepared by emulsion polymerization. The process is carried out in the presence of tert-nonyl mercaptan as chain transfer agent. Here, the tert-nonyl mercaptan can be, for example, a) tert-nonyl mercaptan having a purity of at least 95% by weight, preferably at least 97% by weight, or b) a mixture containing at least 50% by weight but less than 95% by weight of tert-nonyl mercaptan together with one or more further isomeric nonyl mercaptans and/or one or more further $C_{10}$-$C_{16}$-alkyl thiols.

The tert-nonyl mercaptan a) is commercially available, e.g. from Sigma Aldrich (CAS No. 25360-10-5) in a purity of at least 97% by weight or from Chevron Phillips as the product Sulfol® 90 having a purity of at least 97% by weight or from various chemical manufacturers.

Mixtures b) containing at least 50% by weight but less than 95% by weight of tert-nonyl mercaptan together with one or more further isomeric nonyl mercaptans and/or one or more further $C_{12}$-$C_{16}$-alkyl thiols are likewise commercially available, e.g. as mercaptans 175 from Atofina having a content of tert-nonyl mercaptan of 65% by weight and dodecyl mercaptans of 35% by weight or Sulfol® 100 from Chevron Phillips.

The chain transfer agent used is usually employed in the polymerization in an amount of from 0.05 to 3 parts by weight, preferably from 0.1 to 1.5 parts by weight, based on 100 parts by weight of the monomer mixture. A person skilled in the art can determine suitable amounts in simple tests.

The chain transfer agent or the chain transfer agent mixture is introduced either exclusively at the beginning of the polymerization or at the beginning and additionally in portions during the course of the polymerization. In the case of batch processes, the entire amount of the chain transfer agent or the chain transfer agent mixture is typically added at the beginning, while in the case of a continuous process an incremental addition has been found to be useful. The chain transfer agent or the chain transfer agent mixture is then usually added in at least two stages, with addition in two, three or even more stages being possible. Even continuous introduction over the entire polymerization time is possible. The chain transfer agent or the chain transfer agent mixture is particularly preferably added in two stages. In the case of a two-stage introduction, it has been found to be useful for the chain transfer agent/the chain transfer agent mixture to be initially added in an amount of from 5 to 65% by weight, preferably from 10 to 60% by weight, based on the total amount of chain transfer agent/chain transfer agent mixture, before commencement of the polymerization and the remaining amount of chain transfer agent/chain transfer agent mixture to be introduced in a subsequent introduction at a conversion of from 5 to 80%, preferably from 10 to 55%, based on the total amount of monomers used. In the case of a triple or multiple introduction, it is advisable to determine the most advantageous amount of chain transfer agent and the most advantageous time of introduction by means of suitable preliminary tests.

The chain transfer agent is owing to its function, incorporated to a certain extent in the form of end groups in the nitrile rubber, i.e. the nitrile rubber contains $C_9$-alkylthio end groups. In one embodiment, the textile floor covering of the invention thus contains, in the rear-side support layer, a vulcanizate based on at least one nitrile rubber (1) containing $C_9$-alkylthio end groups and having an emission ratio E according to the formula (1) of less than or equal to 0.25 mg/(kg*Mooney units), preferably less than or equal to 0.22 mg/(kg*Mooney units) and particularly preferably less than or equal to 0.20 mg/(kg*Mooney units). In a specific variant of this embodiment, the vulcanizate is based on at least one nitrile rubber having repeating units composed exclusively of acrylonitrile and butadiene.

Pulverulent mixtures which are based on nitrile rubbers whose polymerization is not carried out using the specific chain transfer agent and not carried out to conversions of at least 60%, based on the sum of the monomers used, display significantly poorer emission behaviour. Components based on vulcanizates which are produced using the pulverulent mixtures of the invention display no odour pollution at all in the relevant applications. The mixtures based on the specific nitrile rubbers at the same time display excellent vulcanization behaviour.

Emulsifiers:

As emulsifiers, it is possible to use water-soluble salts of anionic emulsifiers or uncharged emulsifiers. Preference is given to using anionic emulsifiers.

As anionic emulsifiers, it is possible to use modified resin acids which are obtained by dimerization, disproportionate, hydrogenation and modification of resin acid mixtures containing abietic acid, neoabietic acid, palustric acid, laevopimaric acid. A particularly preferred modified resin acid is the disproportionate resin acid (Ullmann's Encyclopedia of Industrial Chemistry, 6$^{th}$ Edition, Volume 31, pp. 345-355).

Fatty acids can also be used as anionic emulsifiers. These contain from 6 to 22 carbon atoms per molecule. They can be fully saturated or else contain one or more double bonds in the molecule. Examples of fatty acids are caproic acid, lauric acid, myristic acid, palmitic acid, stearic acid, oleic acid, linoleic acid, linolenic acid. The carboxylic acids are usually based on origin-specific oils or fats such as castor oil, cottonseed oil, peanut oil, linseed oil, coconut oil, palm kernel oil, olive oil, rapeseed oil, soya bean oil, fish oil and beef tallow, etc. (Ullmann's Encyclopedia of Industrial Chemistry, 6$^{th}$ Edition, Volume 13, pp. 75-108). Preferred carboxylic acids are derived from coconut oil and from beef tallow and are partially or fully hydrogenated.

Such carboxylic acids based on modified resin acids and fatty acids are used as water-soluble lithium, sodium, potassium and ammonium salts. The sodium and potassium salts are preferred.

Further anionic emulsifiers are sulphonates, sulphates and phosphates which are bound to an organic radical. Possible organic radicals are aliphatic radicals, aromatic radicals, alkylated aromatics, fused aromatics and methylene-bridged aromatics, with the methylene-bridged and fused aromatics being able to be additionally alkylated. The length of the alkyl chains is from 6 to 25 carbon atoms. The length of the alkyl chains bound to the aromatics is in the range from 3 to 12 carbon atoms.

The sulphates, sulphonates and phosphates are used as lithium, sodium, potassium and ammonium salts. The sodium, potassium and ammonium salts are preferred.

Examples of such sulphonates, sulphates and phosphates are Na lauryl sulphate, Na alkylsulphonate, Na alkylarylsulphonate, Na salts of methylene-bridged arylsulphonates, Na salts of alkylated napthalenesulphonates and also the Na salts of methylene-bridged naphthalenesulphonates, which can also be oligomerized, with the degree of oligomerization being in the range from 2 to 10. The alkylated naphthalenesulphonic acids and the methylene-bridged (and optionally alkylated) naphthalenesulphonic acids are usually present as isomer mixtures which can also contain more than one sulphonic acid group (2 or 3 sulphonic acid groups) in the molecule. Particular preference is given to Na lauryl sulphate, Na alkylsulphonated mixtures having from 12 to 18 carbon atoms, Na alkylarylsulphonates, Na diisobutylenenaphthalenesulphonate, methylene-bridged polynaphthalenesulphonate mixtures and also methylene-bridged arylsulphonate mixtures.

Uncharged emulsifiers are derived from addition products of ethylene oxide and of propylene oxide with compounds having a sufficiently acidic hydrogen atom. These include, for example, phenol, alkylated phenol and alkylated amines. The average degrees of polymerization of the epoxides are in the range from 2 to 20. Examples of uncharged emulsifiers are ethoxylated nonylphenols having 8, 10 and 12 ethylene oxide units. The uncharged emulsifiers are usually not used alone, but instead in combination with anionic emulsifiers.

Preference is given to the Na and K salts of disproportionate abietic acid and of partially hydrogenated tallow fatty acid, and also mixtures thereof, sodium lauryl sulphate, Na alkylsulphonates, sodium alkylbenzenesulphonate and also alkylated and methylene-bridged naphthalenesulphonic acids.

The emulsifiers are used in a total amount of 0.2-15 parts by weight, preferably 0.5-12.5 parts by weight, particularly preferably 1.0-10 parts by weight, based on 100 parts by weight of the monomer mixture.

The emulsion polymerization is carried out using the abovementioned emulsifiers. If latices which, owing to a certain degree of instability, tend to undergo premature self-coagulation are obtained after conclusion of the polymerization, the abovementioned emulsifiers can also be used for after-stabilizing the latices. This can, in particular, be necessary before removal of unreacted monomers by treatment with steam or before storage of a latex.

Polymerization Initiators:

Polymerization initiators which disintegrate into free radicals are typically used for initiating the emulsion polymerization. These include compounds which contain an —O—O-unit (peroxo compounds) or an —N=M-unit (azo compound).

Peroxo compounds include hydrogen peroxide, peroxodisulphates, peroxodiphosphates, hydroperoxides, peracids, peracid esters, peracid anhydrides and peroxides having two organic radicals. Suitable salts of peroxodisulphuric acid and of peroxodiphosphoric acid are the sodium, potassium and ammonium salts. Suitable hydroperoxides are, for example, t-butyl hydroperoxide, cumene hydroperoxide and p-menthane hydroperoxide. Suitable peroxides having two organic radicals are dibenzoyl peroxide, 2,4,-dichlorobenzoyl peroxide, di-t-butyl peroxide, dicumyl peroxide, t-butyl perbenzoate, t-butyl peracetate, etc. Suitable azo compounds are azobisisobutyronitrile, azobisvaleronitrile and azobiscyclohexanenitrile.

Hydrogen peroxide, hydroperoxides, peracids, peracid esters, peroxodisulphate and peroxodiphosphate are also used in combination with reduced agents. Suitable reducing agents are sulphenates, sulphinates, sulphoxylates, dithionite, sulphite, metabisulphite, disulphite, sugar, urea, thiourea, xanthogenates, thioxanthogenates, hydrazinium salts, amines and amine derivatives such as aniline, dimethylaniline, monoethanolamine, diethanolamine or triethanolamine. Initiator systems consisting of an oxidizing agent and a reducing agent are referred to as redox systems. When redox systems are used, salts of transition metal compounds such as those of iron, cobalt or nickel in combination with suitable complexing agents such as sodium ethylenediaminetetraacetate, sodium nitrilotriacetate and trisodium phosphate or tetrapotassium diphosphate are frequently additionally used.

Preferred redox systems are, for example:
1) potassium peroxodisulphate in combination with triethanolamine,
2) ammonium peroxodiphosphate in combination with sodium metabisulphite ($Na_2S_2O_3$),
3) p-menthane hydroperoxide/sodium formaldehyde sulphoxylate in combination with Fe(II) sulphate ($FeSOi_4*7\ H_2O$), sodium ethylenediaminoacetate and trisodium phosphate;
4) cumene hydroperoxide/sodium formaldehyde sulphoxylate in combination with Fe(II) sulphate ($FeSO_4*7\ H_2O$), sodium ethylenediaminoacetate and tetrapotassium diphosphate,
5) pinane hydroperoxide/sodium formaldehyde sulphoxylate in combination with Fe(II) sulphate ($FeSO_4*7\ H_2O$), sodium ethylenediaminoacetate and trisodium phosphate.

The amount of oxidizing agent is from 0.001 to 1 part by weight based on 100 parts by weight of monomer. The molar amount of reducing agent is in the range from 50% to 500%, based on the molar amount of the oxidizing agent used.

The molar amount of complexing agent is based on the amount of transition metal used and is usually equimolar with this.

To carry out the polymerization, all components or individual components of the initiator system are introduced at the beginning of the polymerization or during the polymerization.

The portionwise addition of all or individual components of the activator system during the polymerization is preferred. The reaction rate can be controlled by means of the sequential addition.

The polymerization time is in the range from 1 hour to 25 hours, preferably from 2 to 25 hours, and depends substantially on the acrylonitrile content of the monomer mixture and on the polymerization temperature.

The polymerization temperature is in the range from 0 to 30° C., preferably from 5 to 25° C.

It is important for obtaining the nitrile rubbers of the invention that the polymerization is carried out to a conversion of at least 60% based on the monomer mixture used. The polymerization is preferably carried out to a conversion in the range from 60 to 100%, particularly preferably from 62 to 100%, in particular from 65 to 100%. When this conversion is reached, the polymerization is stopped.

For this purpose, a stopper is added to the reaction mixture. Stoppers suitable for this purpose are, for example, dimethyl dithiocarbamate, Na nitrite, mixtures of dimethyl dithiocarbamate and Na nitrite, hydrazine and hydroxylamine and also salts derived therefrom, e.g. hydrazinium sulphate and hydroxylammonium sulphate, diethylhydroxylamine, diisopropylhydroxylamine, water-soluble salts of hydroquinone, sodium dithionite, phenyl-α-naphthylamine and aromatic phenols such as tert-butylcatechol, or phenothiazine.

The amount of water used in the emulsion polymerization is in the range from 100 to 900 parts by weight, preferably in the range from 120 to 500 parts by weight, particularly preferably in the range from 150 to 400 parts by weight of water, based on 100 parts by weight of the monomer mixture.

To reduce the viscosity during the polymerization, to set the pH and also as pH buffer, salts can be added to the aqueous phase in the emulsion polymerization. Typical salts are salts of monovalent metals in the form of potassium hydroxide and sodium hydroxide, sodium sulphate, sodium carbonate, sodium hydrogencarbonate, sodium chloride and potassium chloride. Preference is given to sodium hydroxide and potassium hydroxide, sodium hydrogencarbonate and potassium chloride. The amounts of these electrolytes are in the range from 0 to 1 part by weight, preferably from 0 to 0.5 part by weight, based on 100 parts by weight of the monomer mixture.

The polymerization can be carried out either batchwise or continuously in a cascade of stirred vessels.

To achieve a uniform course of the polymerization, only part of the initiator system is used for starting the polymerization and the remainder is introduced during the polymerization. The polymerization is usually started using 10-80% by weight, preferably 30-50% by weight, of the total amount of initiator. The further introduction of individual constituents of the initiator system is also possible.

If chemically uniform products are to be prepared, further acrylonitrile or butadiene is introduced when the composition is to be outside the azeotropic butadiene/acrylonitrile ratio. Further introduction is preferably carried out in the case of NBR types having acrylonitrile contents of from 10 to 34% by weight and also in the case of types having from 40 to 50% by weight of acrylonitrile (W. Hofmann, "Nitrilkautschuk", Berliner Union, Stuttgart, 1965, pages 58-66). The further introduction is, as indicated, for example, in DD 154 702, preferably carried out under computer control on the basis of a computer program.

To remove unreacted monomers, the terminated latex can be subjected to steam distillation. Here, temperatures in the range from 70° C. to 150° C. are employed, and in the case of temperatures of <100° C. the pressure is reduced. Before the steam distillation, after-stabilization of the latex can be carried out using an emulsifier. For this purpose, it is advantageous to use the abovementioned emulsifiers in amounts of from 0.1 to 2.5% by weight, preferably from 0.5 to 2.0% by weight, based on 100 parts by weight of nitrile rubber.

Production of the Inventive Pulverulent Mixtures Containing the Nitrile Rubber:

The production of the pulverulent mixtures containing nitrile rubber can be carried out in various ways and in each case comprise bringing the specific nitrile rubber (1) as defined above into contact with the one or more release agents (2). The production of the nitrile rubber component (1) typically comprises either a milling step (route 1) or else a spray drying step (route 2), during the course of which contacting with the release agent(s) occurs in each case.

Route 1:

As described above, nitrile rubbers are ultimately obtained in the form of rubber crumbs after the emulsion polymerization and work-up and these are frequently pressed to form rubber balls. To produce the pulverulent mixtures of the invention, the rubber balls or crumbs are comminuted to the desired particle size by mechanical treatment, viz. milling and/or micronization, which can optionally be carried out in a plurality of stages. In order to prevent coagulation of the elastomeric particles, at least one release agent is introduced in the production process. The resulting pulverulent mixtures based on nitrile rubber and release agent are stable on storage for a number of months in respect of their polymer properties and their particle size distribution.

Route 1 thus comprises, after the emulsion polymerization, coagulation of the latex, subsequent washing and drying of the coagulated nitrile rubber to isolate rubber crumbs, optionally pressing to form rubber balls and finally communition and milling of the rubber balls or crumbs by mechanical treatment, which can optionally be carried out in a number of stages. It is possible, for example, to carry out coarse milling in a first step and fine milling, also known as micronization, in the second step. The release agent is typically added during the milling operation and can be effected in one portion or else incrementally in various portions.

Latex-Coagulation:

One or more ageing initiators can be added to the latex before or during latex coagulation. Phenolic, amine and other ageing inhibitors are suitable for this purpose.

Suitable phenolic ageing inhibitors are alkylated phenols, styrenated phenol (CAS No. 61788-44-1), sterically hindered phenols such as 2,6-di-tert-butylphenol, 2,6-di-tert-butyl-p-cresol (Vulkanox BHT, CAS No. 000128-37-0), 2,6-Di-tert-butyl-4-ethylphenol, 2,2'-methylenebis(6-tert-butyl)-p-cresol (Vulkanox BKF, CAS No. 000119-47-1), poly(dicyclopentadiane-co-p-cresol), sterically hindered phenols containing ester groups, e.g. n-octadecyl (beta)-(4-hydroxy-3,5-di-tert-butylphenyl)propionate, thioether-containing sterically hindered phenols, 2,2'-methylenebis(4-methyl-8-tert-butylphenol) (BPH), 2-methyl-4,6-bis(octylsulphanylmethyl)phenol and sterically hindered thiobisphenols. In further embodiments, two or more ageing inhibitors, e.g. a mixture of n-octadecyl β-(4-hydroxy-3,5-di-tert-butylphenyl)propionate, poly(dicyclopentadiene-co-p-cresol) and 2-methyl-4,6-bis(octylsulphanylmethyl)phenol, are also added.

If discoloration of the rubber is unimportant, amine ageing inhibitors, e.g. mixtures of diaryl-p-phenylenediamines (DTPD), octylated dphenylamine (ODPA), phenyl-α-naphthylamine (PAN), phenyl-β-naphthylamine (PBN), preferably ones based on phenylenediamine, are also used. Examples of phenylenediamines are N-isopropyl-N'-phenyl-p-phenylenediamine, N-1,3-dimethylbutyl-N'-phenyl-p-phenylenediamine (6PPD), N-1,4-dimethylpentyl-N'-phenyl-p-phenylenediamine (7PPD), N—N'-bis-1,4-(1,4-dimethylpentyl)-p-phenylenediamine (77PD), etc.

Other ageing inhibitors include phosphites such as tris(nonylphenyl)phosphite, polymerized 2,2,4-trimethyl-1,2-dihydroquinoline (TMQ), 2-mercaptobenzimidazole (MBI), methyl-2-mercaptobenzimidazole (MMBI), zinc methyl-mercaptobenzimidazole (ZMMBI). The abovementioned other ageing inhibitors are often used in combination with phenolic ageing inhibitors. The other ageing inhibitors TMQ, MBI and MMBI are used mainly for NBR types which are periodically vulcanized.

For the coagulation, the latex is brought to a pH known to those skilled in the art by addition of a base, preferably ammonia or sodium hydroxide or potassium peroxide, or an acid, preferably sulphuric acid or acidic acid.

In an embodiment of the process, the coagulation is carried out using at least one salt selected from the group consisting of aluminium, calcium, magnesium, sodium, potassium and lithium salts. As anions of these salts, use is usually made of monovalent or divalent anions. Preference is given to halides, particularly preferably chloride, nitrate, sulphate, hydrogencarbonate, carbonate, formate and acetate.

Suitable salts are, for example, sodium chloride, potassium chloride, calcium chloride, magnesium chloride, sodium nitrate, potassium nitrate, sodium sulphate, potassium sulphate, sodium hydrogencarbonate, potassium hydrocarbonate, sodium carbonate, potassium carbonate, aluminium sulphate, potassium aluminium sulphate (potash alum), sodium aluminium sulphate (sodium alum), sodium acetate, calcium acetate and calcium formate. If a water-soluble calcium salt is used for latex coagulation, calcium chloride is preferred.

The salts are added in an amount of from 0.05 to 10% by weight, preferably from 0.5 to 8% by weight, particularly preferably from 1 to 5% by weight, based on the solids content of the latex dispersion.

In addition to at least one salt from the above-defined group, precipitation aids can also be used in the coagulation. Possible precipitation aids are, for example, water-soluble polymers. These are nonionic, anionic or cationic.

Examples of non-ionic polymeric precipitation aids are modified celluloses such as hydroxyalkyl cellulose or methyl cellulose and also adducts of ethylene oxide and propylene oxide with compounds having an acidic hydrogen. Examples of compounds having an acidic hydrogen are: fatty acids, sugars such as sorbitol, monofatty acid and difatty acid glycerides, phenol, alkylated phenols, (alkyl)phenol/formaldehyde condensates, etc. The addition products of ethylene oxide and propylene oxide to these compounds can have a random or block structure. Among these products, preference is given to those in the case of which the solubility decreases with increasing temperature.

Examples of anionic polymeric precipitation aids are the homopolymers and copolymers of (meth)acrylic acid, maleic acid, maleic anhydride, etc. The Na salt of polyacrylic acid is preferred.

Cationic polymeric precipitation aids are usually based on polyamines and on homopolymers and copolymers of (meth)acrylamide. Preference is given to polymethacrylamides and polyamines, in particular those based on epichlorohydrin and dimethylamine. The amounts of polymeric precipitation aids are from 0.01 to 5 parts by weight, preferably from 0.05 to 2.5 parts by weight, per 100 parts by weight of nitrile rubber.

The use of other precipitation aids is also conceivable. However, it is readily possible to carry out the process of the invention in the absence of additional precipitation aids.

The latex used for coagulation advantageously has a solids content in the range 1-40% by weight, preferably in the range from 5-35% by weight and particularly preferably in the range from 15-30% by weight.

The latex coagulation is carried out in the temperature range from 10 to 110° C., preferably from 20 to 100° C., particularly preferably from 50 to 98° C. The latex coagulation can be carried out continuously or batchwise, with preference being given to continuous operation.

In an alternative embodiment, the latex, which has usually been separated off from unreacted monomers, can also be treated with acids in a pH range of ≤6, preferably ≤4, particularly preferably 2, as a result of which the polymer precipitates. All mineral and organic acids which allow the selected pH ranges to be set can be used for the precipitation. Mineral acids are preferably used for setting the pH. The polymer is subsequently separated off from the suspension in a conventional manner known to those skilled in the art. This, too, can be carried out continuously or batchwise, with preference being given to continuous operation.

Washing and Drying of the Coagulated Nitrile Rubber:

After coagulation, the nitrile rubber is usually present in the form of crumbs. The washing of the coagulated NBR is therefore also referred to as crumb washing. This washing can be carried out using either deionized water or water which has not been deionized. Washing is carried out at a temperature in the range from 15 to 90° C., preferably at a temperature in the range from 20 to 80° C. The amount of washing water is from 0.5 to 20 parts by weight, preferably from 1 to 10 parts by weight and particularly preferably from 1 to 5 parts by weight, based on 100 parts by weight of nitrile rubber. The rubber crumbs are preferably subjected to multistage washing, the rubber crumbs being partly dewatered between the individual washing stages. The residual moisture content of the crumbs between the individual washing stages is in the range from 5 to 50% by weight, preferably in the range from 7 to 25% by weight. The number of washing stages is usually from 1 to 7, preferably from 1 to 3. Washing is carried out batchwise or continuously. Preference is given to using a multistage, continuous process, with countercurrent washing being preferred in order to save water. After conclusion of washing, it has been found to be useful to dewater the nitrile rubber crumbs. Drying of the predewatered nitrile rubber is carried out in a dryer; suitable dryers are, for example, fluidized bed dryers or plate dryers. The temperatures during drying are from 80 to 150° C. Preference is given to drying according to a temperature programme, with the temperature being decreased towards the end of the drying process.

Apparatuses and milling appliances known to those skilled in the art are suitable for comminution and milling.

Route 2:

The second possible method starts out directly from the polymer latex obtained in the emulsion polymerization, which is a suspension of solid polymer particles in water which is typically stabilized by means of emulsifiers. From this latex, the pulverulent elastomer is obtained directly by separating off the water from the latex by means of spray drying of the polymer and to give the polymer in the form of a fine powder. The release agent(s) is/are introduced as described below.

The spray drying of the latices from the emulsion polymerization is generally carried out in conventional spray dryers. Here, the latex, which has preferably been heated to from 15 to 100° C., is fed into the spray dryer by means of pumps and sprayed by means of nozzles which are, for example, located in the top of the dryer, preferably at pressures of from 50 to 500 bar, preferably from 100 to 300 bar. In one embodiment, a subatmospheric pressure in the range from 100 to 500 mbar, preferably from 150 to 400 mbar, prevails in the spray dryer. Hot air having an inlet temperature of preferably from 100 to 350° C. is, for example, introduced in countercurrent and evaporates the water. The powder drops downwards and the dry powder is discharged at the bottom of the dryer. The release agent or agents and optionally further additives such as ageing inhibitors, antioxidants, optical brighteners, etc., are preferably blown in as dry powders, likewise at the top of the dryer. They can also be added partly or in their entirety to the latex before spray drying. The latices fed into the spray dryer preferably have solids concentrations of 10-60% by weight, particularly preferably 20-50% by weight and in particular 30-50% by weight, based on the latex.

Both routes make it possible to obtain, owing to the specific low-emission NBRs used in combination with the release agent, a stable powder form which has a significantly reduced VOC content. It is important that this reduction of the VOC content is achieved during production of the mixture, so that, as described below, there is no longer any exposure which could be hazardous to health during subsequent processing to give composites. Happily, the reduction in the VOC content is achieved according to the invention without the polymer having to be subjected to increased thermal stress and prolonged processing, which in the processes of the prior art sometimes has or can have an adverse effect on the polymer structure, on the ageing behaviour, the elasticity or the colour stability of the products.

The invention further provides composites containing
(A) at least one pulverulent mixture according to the invention containing at least one nitrile rubber (1) as specifically defined above and one or more release agents (2) which have the average particle diameter $D_R$ as defined above in the range from 0.01 to 4 mm and
(B) one or more thermoplastic polymers.

In a preferred embodiment, the component (B) is selected from the group consisting of polyvinyl chloride, polyurethanes, polyamides, epoxy resins, phenolic resins, polypropylene, polyethylene, polyethylene-vinyl acetate and polystyrene.

In a particularly preferred embodiment, the component (B) is selected from the group consisting of polyvinyl chloride, polyurethanes and polyamides.

It has been found to be useful to use the components (A) (nitrile rubber) and (B) (thermoplastic) in a weight ratio of (1-99):(99-1), preferably (10-60):(90-40).

These composites display excellent and homogeneous dispersion of the pulverulent mixtures in the thermoplastic and therefore lead to the desired property improvements, e.g. an excellent impact toughness.

The invention further provides a process for producing the composites defined above by mixing the two components (A) and (B) with one another.

Mixing of the components is typically carried out either in a mechanical mixer, on a roll mill or else by means of an extruder. As mechanical mixers, those having an "intermeshing" rotor geometry are usually employed. At the starting point, the mechanical mixer, the roll mill or the extruder is supplied with the pulverulent mixture according to the invention and/or the one or more thermoplastic(s). Mixing is carried out with control of the temperature, with the proviso that the material being mixed remains for an appropriate time at a temperature which brings about melting of the thermoplastic component (B). Temperatures in the range from 100 to 280° C. are usually selected. If further additives are to be added, these are added at suitable points in time. After a further suitable mixing time, the mechanical mixer is vented and emptied to give the composite. All periods of time mentioned above are usually in the region of a few minutes and can be easily determined by a person skilled in the art as a function of the mixture to be produced. If a roll mill is used as mixing apparatus, introduction can be carried out in an analogous way and order. Alternative useful orders of addition are possible and can be discovered by a person skilled in the art by means of a few mixing tests.

In alternative embodiments, it can be useful to add further components in the production of the composites.

In all the further details givers below, "phr" is, without this being mentioned every time, "parts per hundred of rubber" and is thus based on 100 parts by weight of all rubbers used for producing the composite. If the composite contains exclusively the nitrile robber component (1) as rubber, the phr figures for the further components are thus based on 100 parts by weight of the nitrile rubber.

One or more crosslinkers are optionally used in the production of the composites. Possibilities here are, for example, peroxidic crosslinkers such as bis(2,4-dichlorobenzyl) peroxide, dibenzoyl peroxide, bis(4-chlorobenxoyl) peroxide, 1,1-bis(t-butylperoxy)-3,3,5-trimethylcylohexane, tert-butyl perbenzoate, 2,2 bis(t-butylperoxy) butene, 4,4-di-tert-butyl peroxy(nonyl valerate), dicumyl peroxide, 2,5-dimethyl-2,5-di(t-butylperoxy)hexane, tert-butyl cumyl peroxide, 1,3-bis(t-butylperoxyisopropyl)benzene, di-t-butyl peroxide and 2,5-dimethyl-2,5-di(t-butylperoxy)-3-hexyne.

It can be advantageous to use further additives by means of which the crosslinking yield can be increased in addition to these peroxidic crosslinkers: additives suitable for this purpose are, for example, triallyl isocyanurate, triallyl cyanurate, trimethylolpropane tri(meth)acrylate, triallyl trimethacrylate, ethylene glycol dimethacrylate, butanediol dimethacrylate, trimethylolpropane trimethacrylate, Zn diacrylate, Zn dimethacrylate, 1,2-polybutadiene or N,N-'m-phenylene-dimaleimide.

If they are used, the total amount of the crosslinker(s) is usually in the range from 0.05 to 20 phr, preferably in the range from 0.1 to 10 phr, particularly preferably in the range from 0.2 to 8 phr and in particular in the range from 0.2 to 5 phr.

As crosslinker, it is also possible to use sulphur in elemental soluble or insoluble form or sulphur donors.

If sulphur is used as crosslinker, it is usually used in an amount of from 0.1 to 10 phr, preferably from 0.2 to 5 phr and particularly preferably from 0.2 to 3 phr.

Possible sulphur donors are, for example, dimorpholyl disulphide (DTDM), 2-morpholino-dithiobenzothiazole (MBSS), caprolactam disulphide, dipentamethylenethiuram tetrasulphide (DPTT), and tetramethylthiuram disulphide (TMTD). If a sulphur donor is used as crosslinker (2), the amount is usually from 1 to 10 phr, preferably from 1 to 6 phr and particularly preferably from 1 to 4 phr.

It can be useful to employ one or more fillers in the production of the composite: possible fillers here are, for example, carbon black, silica, barium sulphate, titanium dioxide, zinc oxide, calcium oxide, calcium carbonate, magnesium oxide, aluminium oxide, iron oxide, aluminium hydroxide, magnesium hydroxide, aluminium silicates, diatomaceous earth, talc, Kaolins, bentonites, carbon nanotubes, Teflon (the latter preferably in powder form) or silicates.

The filler can be used in an amount of from 1 to 600 phr, preferably 10-500 phr, particularly preferably 20-400 phr and in particular 50-300 phr.

In addition to the crosslinker, it is possible to use one or more crosslinking accelerators by means of which the crosslinking yield can be increased. However, crosslinking can in principle also be carried out using one or more crosslinkers alone. If one or more crosslinking accelerator(s) is/are used, the amount is usually up to 15 phr, preferably 0.05-13 phr, particularly preferably 1-12 phr and in particular 1-10 phr.

If crosslinking accelerators are used in mixtures with, for example, paraffins or other substances, the phr figure indicated above relates to the respective active substance.

Suitable additives of this type by means of which the crosslinking yield can be increased are, for example, dithiocarbarnates, thiurams, thiazoles, sulphenamides, xanthogenates, guanidine derivatives, caprolactams and thiourea derivates.

As dithiocarbamates, it is possible to use, for example, ammonium dimethyldithiocarbamate, sodium diethyldithiocarbamate (SDEC), sodium dibutyldithiocarbamate (SDBC), zinc dimethyldithiocarbamate (ZDMC), zinc diethyldithiocarbamate (ZDEC), zinc dibutyldithiocarbamate (ZDBC), zinc ethylphenyldithiocarbamate (ZEPC), zinc dibenzyldithiocarbamate (ZBEC), zinc pentamethylenedithiocarbamate (Z5MC), tellurium diethyldithiocarbamate, nickel dibutyldithiocarbamate, nickel dimethylithiocarbamate and zinc diisononyldithiocarbamate.

As thiurams, it is possible to use, for example, tetramethylthiuram disulphide (TMTD), tetramethylthiuram monosulphide (TMTM), dimethyldiphenylthiuram disulphide, tetrabenzylthiuram disulphide, dipentamethylenethiuram tetrasulphide and tetraethylthiuram disulphide (TETD).

As thiazoles, it is possible to use, for example, 2-mercaptobenzothiazole (MBT), dibenzthiazyl disulphide (MBTS), zinc mercaptobenzothiazole (ZMBT) and copper 2-mercaptobenzothiazole.

As sulphenamide derivates, it is possible to use, for example, N-cyclohexyl-2-benzothiazylsulphenamide (CBS), N-tert-butyl-2-benzthiazylsulphanamide (TBBS), N,N'-dicyclohexyl-2-benzthiazylsulphenamide (DCBS), 2-morpholinothiobenzthiazole (MBS), N-oxy-diethylenethiocarbamyl-N-tert-butylsulphenamide or oxydiethylenethiocarbamyl-N-oxyethylene-sulphenamide.

As xanthogenates, it is possible to use, for example, sodium dibutylxanthogenate, zinc isopropyl-dibutylxanthogenate or zinc dibutylxanthogenate.

As guanidine derivates, it is possible to use, for example, diphenylguanidine (DPG), di-o-tolylguanidine (DOTG) or o-tolylbiguanide (OTBG).

As dithiophosphates, it is possible to use, for example, zinc dialkyldithiophosphates (chain length of the alkyl radicals from $C_2$ to $C_{16}$), copper dialkyldithiophosphates (chain length of the alkyl radicals from $C_2$ to $C_{16}$) or dithiophosphoryl polysulphide.

As caprolactam, it is possible to use, for example, dithiobiscaprolactam.

As thiourea derivates, it is possible to use, for example, N,N'-diphenylthiourea (DPTU), diethylthiourea (DETU) and ethylenethiourea (ETU).

Examples of compounds which are likewise suitable as additives are: zinc diamine diisocyanate, hexamethylenetetramine, 1,3-bis(citraconimidomethyl)benzene and also cyclic disulphanes.

The abovementioned crosslinking accelerators can be used either individually or in mixtures. Preference is given to using the following substances for crosslinking the nitrile rubbers: 2-mer-captobenzthiazole, tetraethylthiuram disulphide, tetramethylthiuram monosulphide, zinc dibenzyldithiocarbamate, dipentamethylenethiuram tetrasulphide, zinc dialkyldithiophosphate, dimorpholyl disulphide, tellurium diethyldithiocarbamate, nickel dibutyldithiocarbamate, zinc dibutyldithiocarbamate, zinc dimethyldithiocarbamate and dithiobiscaprolactam.

In the case of sulphur crosslinking, it may also be useful to make concomitant use of further inorganic or organic substances as component (4) in addition to the crosslinkers and the abovementioned crosslinking accelerators, for example: zinc oxide, zinc carbonate, lead oxide, magnesium oxide, saturated or unsaturated organic fatty acids such as steric acid and zinc salts thereof, polyalcohols, amino alcohols, for example triethanolamine, and also amines such as dibutylamine, dicyclohexylamine, cyclohexylethylamine and polyether amines.

In addition, incipient vulcanization retarders can also be used. These include cyclohexylthiophthalimide (CTP), N,N'-dinitrosopentamethlyenetetramine (DNPT), phthalic anhydride (PTA) and diphenylnitrosamine. Preference is given to cyclohexylthiophthalimide (CTP).

It is also possible to use filler activators in the production of the composites of the invention. Preference is given here to organic silanes, particularly preferably vinyltrimethyloxysilane, vinyldimethoxymethylsilane, vinyltriethoxysilane, vinyltris(2-methoxyethoxy)silane, N-cyclohexyl-3-aminopropyltrimethoxysilane, 3-aminopropyltrimethoxysilane, methyl-trimethoxysilane trimethyitriethoxysilane, dimethyldimethoxysilane, dimethyldiethoxysilane, trimethylethoxysilane, isooctyltrimethoxysilane, isooctyltriethoxysilane, hexadecyltrimethoxysilane or (octadecyl)methyldimethoxysilane. Further filler activators are, for example, surface-active substances such as triethanolamine and ethylene glycols having molecular weights of from 74 to 10 000 g/mol.

If filler activators are used, they are usually employed in an amount of up to 10 phr, preferably 0.01-10 phr, particularly preferably 0.25-10 phr and in particular from 0.5 to 7 phr.

It is also possible to use one or more ageing inhibitors in the production of the composites of the invention. Here, it is possible to add all those which have been described above in the present application in the context of latex coagulation. They are usually employed in amounts of up to 5 phr, preferably 0.2-5 phr, particularly preferably 0.25-4 phr and in particular 0.5-3 phr.

It is also possible to use ozone stabilizers in the production of the composites of the invention, with preference being given to using paraffinic waxes, microwaxes, nickel dibutyldithiocarbamate, phenylenediamines, Vulkazon AFS/LG (CAS No. 006600-31-3) or Vulkazon AFD (CAS No. 022428-48-4). If they are used, the amounts are usually up to 5 phr, preferably 0.2-5 phr, particularly preferably 0.25-4 phr and in particular 0.5-3 phr.

It is additionally possible to use one or more plasticizers, preferably, for example, the following: phthalic esters such as DOP or DINP, adipates such as DOA, mellitates or trimellitates such as TOTM, sebacates such as DOS, diester-ether mixtures such as Rhenosin® W759, thioethers such as Vulkanol® OT, phosphates such as Disflamoll®, Mesamoll® or polymeric plasticizers such as Ultramoll® and bio-based plasticizers such as ESBO, in the production of the composites of the invention.

The plasticizer(s) is/are usually employed in an amount of up to 180 phr, preferably from 0.5 to 150 phr, particularly preferably from 1 to 125 phr and in particular from 1 to 100 phr.

The invention further provides for the use of the composites for producing components, preferably for use in automobile interiors and provides the components based on these composites.

EXAMPLES

I. Analysis

Acrylonitrile Content:

The nitrogen content for determining the acrylonitrile content was determined in the nitrile rubbers according to the invention by the Kjeldahl method in accordance with DIN 53 625.

Mooney Determination:

The determination of the Mooney viscosity (ML 1+4 @ 100° C.) was carried out at 100° C. in accordance with ASTM D 1646.

Particle Size Determination:

The particle size of the pulverulent mixture was determined granulometrically. For this purpose, 100 g of the pulverulent mixture were weighed into a sieve having a mesh opening of 2.0 mm. Further sieves having mesh openings of 1.4 mm, 1.0 mm, 0.8 mm, 0.6 mm and 0.3 mm were placed underneath this sieve. The assembled sieves are clamped on a vibratory sieving machine (AS 200 control "g" from Retsch) and vibrated at an amplitude of 2.00 mm for a period of 30 minutes. The individual sieves were then weighed and the average particle size $D_n$ was calculated according to the following formula:

$$D_a = \Sigma(X_i D_i)/100$$

where $D_a$ is the average particle diameter in mm, $X_i$ is the percentage of the total particle mass in g retained on the respective sieve and $D_i$ is the average mesh opening of the respective sieve n and n+1 in mm.

Furthermore, $$D_i = (D_n + D_{(n+1)})/2$$

where $D_n$ is the mesh diameter of the sieve n in mm and $D_{(n+1)}$ is the mesh diameter of the sieve n+1 in mm.

The volatile organic constituents of the nitrile rubbers were quantified in accordance with VBA 278 (2011 version) by means of thermodesorption gas chromatography (TDS-GC/MS).

II. Preparation of NBR Polymers A and B

As basis for producing the examples according to the invention and the comparative examples, two NBR polymers A and B, as indicated in Table 1, were prepared and used.

TABLE I

Preparation of the NBR polymers A and B
(Amounts indicated each in parts by weight based on 100 parts of total monomers (butadiene and acrylonitrile))

| Nitrile rubber | A | B Comparison |
|---|---|---|
| Butadiene (total) | 64.15 | 64.15 |
| Acrylonitrile (total/increment)[1] | 35.85/9 phr | 35.85/9 phr |
| Total amount of water | 200 | 200 |
| Oleic acid[2] | 1.5 | 1.5 |
| Resin acid[3] | 0.6 | 0.6 |
| AOS[4] | 0.4 | 0.4 |
| Sulphole 120/t-DDM[5] (total/increment) | — | 0.31/0.13 |
| Solphole 90[6] (total/increment) | 0.31/0.13 | — |
| Trigonox NT 50[7] | 0.031 | 0.031 |
| Premix FeSO$_4$[8] | 0.027 | 0.027 |
| Diethylhydroxylamine | 0.14 | 0.14 |
| Vulkanox ® BKF[9] | 0.3 | 0.3 |
| pH[10] | 11.0 ± 1.0 | 11.0 ± 1.0 |
| Polymerization temperature [° C.] | 10.0 ± 0.5 | 10.0 ± 0.5 |
| Polymerization conversion [%] | 78 | 78 |

[1] The addition of the increment was carried out at a monomer conversion of 36%
[2] Oleic acid CAS number 67701-06-08
[3] Resin acid CAS number 61790-51-0
[4] AOS sodium α-olefin sulphonate
[5] Sulphole 120 t-DDM (tertiary dodecyl mercaptan) Chevron Philips Chemicals
[6] Sulphole 90 (tertiary nonyl mercaptan) Chevron Philips Chemicals
[7] p-menthane hydroperoxide (Trigonox NT 50 from Akzo-Degussa)
[8] containing the reducing agent Rongalit C (sodium salt of a sulphinic acid derivative) and the Fe(II) salt in the amounts indicated above.
[9] 2-[(2-hydroxy-5-methyl-3-tert-butyl-phenyl)methyl]-4-methyl-6-tert-butyl-phenol Lanxess Deutschland GmbH
[10] measured at the beginning of the polymerization The preparation of the nitrile rubbers A and B was carried out continuously in a cascade of stirred vessels. After introduction of the monomers, the soap AOS and the chain transfer agent (in the amounts indicated in Table 1 based on 100 parts of total monomer) and bringing the contents of the reactor to temperature, the reaction was started by introduction of aqueous solutions of iron(II) salts (in the form of the premix solutions) and of para-menthane hydroperoxide (Trigonox® NT50). The reaction mixture was pumped through the cascade of stirred vessels and when the desired conversion had been reached, the polymerization was terminated by addition of an aqueous solution of diethylhydroxylamine in the last reactor. Unreacted monomers and other volatile constituents were removed by stripping under reduced pressure.

Before coagulation, the NBR latex was in each case admixed with a 50% strength dispersion of Vulkanox® BKF (0.3% by mass of Vulkanox® BKF based on NBR solid). Coagulation and washing were subsequently carried out and the crumbs obtained were dried.

III. Production of Pulverulent Mixtures of NBR A or B and a Release Agent (Examples 1 and 2)

The pulverulent mixtures of NBR and a release agent were prepared on the basis of the NBR polymers A and B, as follows. The amount of NBR crumbs (in g) indicated was intimately mixed with the indicated amount in each case of release agent calcium carbonate (in g). This mixture was gradually introduced into an ultracentrifugal mill ZM 200 (Retsch®) to which the cyclone was attached. The mill was equipped with an annular sieve having an average mesh opening of 1 mm and was operated at a speed of 18 000 rpm. The powder was continuously removed from the milling chamber and collected by means of the cyclone during the course of the milling operation.

TABLE 2

Production of the pulverulent mixtures (Example 1 and 2)

| Pulverulent mixture | 1 (g) | 2 (comparison) (g) |
|---|---|---|
| NBR A | 90 | |
| NBR B | | 90 |
| Calcium carbonate | 10 | 10 |

IV. Production of Pulverulent Mixtures of NBR, a Release Agent and a Thermoplastic (Examples 3 and 4 ("Dry Blend"))

The dry blends were produced by mixing the amounts (in g) indicated in Table 3 in a planetary mixer. The mixer was maintained at 100° C. The pulverulent PVC was introduced together with the stabilizer Mark CZ 97** into the mixing apparatus, and the NBR powder mixtures were added after a mixing time of 5 minutes. After mixing for a further 10 minutes, the dry blend is taken from the mixing apparatus and the material is allowed to cool to room temperature before further processing

TABLE 3

Production of mixtures of NBR, a release agent and a thermoplastic (Examples 3 and 4)

| Mixtures | 3 (g) | 4 (comparison) (g) |
|---|---|---|
| Pulverulent mixture from Example 1 | 100 | |
| Pulverulent mixture from Example 2 | | 100 |
| Vinnolit S 4170* | 300 | 300 |
| Mark ® CZ 97** | 9 | 9 |

*Polyvinyl chloride, pulverulent, from Vinnolit GmbH & Co. KG
**Calcium/zinc stabilizer from Galata Chemicals

V. Extruded Mixtures of NBR, a Release Agent and a Thermoplastic ("Composites") (Examples 5 and 6)

The composites were produced by means of a laboratory extruder "Plasti-Corder Lab Station" from Brabender®. The single-screw extruder had four different heating zones. The temperatures of the individual zones were set to 155° C., 160° C., 165° C. and 170° C. at the commencement of introduction of the sample. The screw was operated at a speed of 100 rpm. A slit-shaped die having a width of 2.5 mm served as tool. The pulverulent Examples 3 and 4 ("dry blends") were fed to the extruder. After introduction for about 30 s, a homogeneous extrudate ("composite") was obtained.

VI. Summary of the Analysis for all Examples

The analytical results on the starting NBR A and B samples and also the pulverulent mixture with the release agent, the mixture with PVC as thermoplastic and the corresponding composites are shown in Table 4 below.

It can clearly be seen that the example according to the invention based on an NBR having an emission coefficient of 0.041 mg/(kg*Mooney units), which is thus below 0.25 mg/(kg*Mooney units), correspondingly also leads to composites which are low-emission materials and can thus be used for critical indoor applications without problems and restrictions.

TABLE 4

Analysis of the nitrile rubbers A and B and also Examples 1-6 ("n.d." means not determined)

| Nitrile rubber/pulverulent mixture/mixture/-composite | A | B Comparison | 1 | 2 Comparison | 3 | 4 Comparison | 5 | 6 Comparison |
|---|---|---|---|---|---|---|---|---|
| ACN total (%) | 32.3 | 33.7 | n.d. | n.d. | n.d. | n.d. | n.d. | n.d. |
| Mooney viscosity (ML1 + 4 @ 100° C.) (MU) | 55 | 48 | n.d. | n.d. | n.d. | n.d. | n.d. | n.d. |

TABLE 4-continued

Analysis of the nitrile rubbers A and B and also Examples 1-6 ("n.d." means not determined)

| Nitrile rubber/pulverulent mixture/mixture/-composite | A | B Comparison | 1 | 2 Comparison | 3 | 4 Comparison | 5 | 6 Comparison |
|---|---|---|---|---|---|---|---|---|
| Average particle size $D_4$ (mm) | n.d. | n.d. | 0.62 | 0.62 | n.d. | n.d. | n.d. | n.d. |
| total VOC (mg/kg)[1] | 88 | 129 | 57 | 109 | 45 | 43 | 15 | 12 |
| Emission coefficient[2] E (mg/kg) | 0.041 | 0.412 | 0.039 | 0.333 | 0.015 | 0.066 | 0.003 | 0.012 |

[1]Total VOC was determined in accordance with VDA 278.

[2] $$E = \frac{[\text{volatile constituents}]}{[\text{Mooney viscosity}]} \times \frac{[\text{Nitrile content}]}{100} \quad (I)$$

where

[volatile constituents] is the concentration of volatile constituents in mg/kg of nitrile rubber determined by means of a TDS-GC/MS examination in accordance with the VDA 278 recommendation (09.2002 version) in the range from 28.4 minutes to 34.0 minutes,

[Mooney viscosity] is the Mooney viscosity ML 1+4 at 100° C. of the nitrile rubber determined in accordance with ASTM D 1646 and reported in Mooney units, and

[nitrile content] is the content of α,β-unsaturated nitrile in the nitrile rubber in % by weight, determined by the Kjeldahl method in accordance with DIN 53 625.

What is claimed is:

1. A pulverulent mixture comprising:
   (1) at least one nitrile rubber which has repeating units of at least one α,β-unsaturated nitrite monomer and at least one conjugated diene monomer and has an emission ratio E according to the formula (I) of less than or equal to $$E = \frac{[\text{volatile constituents}]}{[\text{Mooney viscosity}]} \times \frac{[\text{Nitrile content}]}{100} \quad (I)$$

0.25 mg/(kg*Mooney units),
   where
      [volatile constituents] is the concentration of volatile constituents in mg/kg of nitrile rubber determined by means of a TDS-GC/MS examination in accordance with the VDA 278 recommendation (09.2002 version) in the range from 28.4 minutes to 34.0 minutes,
      [Mooney viscosity] is the Mooney viscosity ML 1+4 at 100° C. of the nitrile rubber determined in accordance with ASTM D 1646 and reported in Mooney units, and
      [nitrite content] is the dimensionless content of the α,β-unsaturated nitrite in the nitrite rubber, determined in % by weight by the Kjeldahl method in accordance with DIN 53 625, and
   (0) one or more release agents,
      wherein particles of the pulverulent mixture have an average particle diameter Da of 0.01 to 4 mm.

2. The pulverulent mixture according to claim 1, wherein the release agent(s) is/are selected from the group consisting of silica, calcium carbonate, silicate, PVC and fatty acid salts.

3. A process producing a pulverulent mixture according to claim 1, the process comprising contacting the nitrite rubber component with the one or more release agents.

4. The process for producing a pulverulent mixture according to claim 3, wherein the nitrile rubber component is produced by a process that comprises either a milling step or else a spray drying step, during the course of which contacting with the release agent(s) occurs in each case.

5. Composites comprising:
   (A) at least one pulverulent mixture according to the invention according to claim 1; and
   (B) one or more thermoplastic polymers.

6. The composites according to claim 5, wherein the thermoplastic polymers are selected from the group consisting of polyvinyl chloride, polyurethanes, polyamides, epoxy resins, phenolic resins, polypropylene, polyethylene, polyethylene-vinyl acetate and polystyrene.

7. The composites according to claim 6, wherein the thermoplastic polymers are selected from the group consisting of polyvinyl chloride, polyurethanes and polyamides.

8. The composites according to claim 5, wherein the components (A) and (B) are used in a weight ratio of (1-99):(99-1), preferably (10-60):(90-40), based on the sum of the components (A) and (B).

9. A process for producing the composites according to claim 5, the process comprising mixing the two components (A) and (B) with one another.

10. A method for producing articles of manufacture, the method comprising producing the articles the composites according to claim 5, wherein the articles of manufacture comprise components for use in automobile interiors.

11. Components based on composites according to claim 5.

12. The pulverulent mixture according to claim 1, wherein the particles have an average particle diameter Da of 0.2 mm to 1.5 mm.

13. The pulverulent mixture according to claim 1, wherein the particles have an average particle diameter Da of 0.08 mm to 0.12 mm.

14. The pulverulent mixture according to claim 1, wherein the nitrite rubber has an emission ratio E according to the general formula (I) of less than or equal to 0.20 mg/(kg*Mooney units).

* * * * *